US 8,434,267 B2

(12) United States Patent
    Bocutto

(10) Patent No.: US 8,434,267 B2
(45) Date of Patent: May 7, 2013

(54) SEALING STRIP FOR VEHICLE WINDOW AND METHOD OF MAKING IT

(75) Inventor: Domenico Bocutto, Nettetal (DE)

(73) Assignee: Henniges Automotive Sealing Systems North America Inc., Farmington Hills, MI (US)

(*) Notice: Subject to any disclaimer, the term of this patent is extended or adjusted under 35 U.S.C. 154(b) by 772 days.

(21) Appl. No.: 12/094,063

(22) PCT Filed: Nov. 14, 2006

(86) PCT No.: PCT/IB2006/003282
§ 371 (c)(1),
(2), (4) Date: Jan. 19, 2009

(87) PCT Pub. No.: WO2007/057766
PCT Pub. Date: May 24, 2007

(65) Prior Publication Data
US 2009/0223135 A1    Sep. 10, 2009

(30) Foreign Application Priority Data
Nov. 18, 2005    (GB) .................................. 0523548.6

(51) Int. Cl.
*E06B 7/16*    (2006.01)
(52) U.S. Cl.
USPC ........... 49/479.1; 49/490.1; 49/495.1; 296/93
(58) Field of Classification Search .......... 49/475.1, 49/490.1, 495.1, 479.1; 296/93, 146.15, 296/146.2; 52/204.53, 204.591, 204.62
See application file for complete search history.

(56) References Cited

U.S. PATENT DOCUMENTS

| | | | | | |
|---|---|---|---|---|---|
| 4,490,942 | A | * | 1/1985 | Arnheim et al. | 49/374 |
| 4,765,677 | A | * | 8/1988 | Nagata | 296/216.09 |
| 4,823,511 | A | * | 4/1989 | Herliczek et al. | 49/404 |
| 4,891,913 | A | * | 1/1990 | Shimura et al. | 49/493.1 |
| 4,925,237 | A | * | 5/1990 | Bohn et al. | 296/216.09 |
| 5,013,379 | A |   | 5/1991 | Brooks et al. | |

(Continued)

FOREIGN PATENT DOCUMENTS

| DE | 10159251 | 4/2003 |
|---|---|---|
| GB | 2286516 | 11/1994 |

(Continued)

OTHER PUBLICATIONS http://education.yahoo.com/reference/dictionary/entry/interlock.*

*Primary Examiner* — Katherine Mitchell
*Assistant Examiner* — Marcus Menezes
(74) *Attorney, Agent, or Firm* — Howard & Howard Attorneys PLLC

(57) ABSTRACT

A window assembly for sealingly attaching a window glass to a frame of a motor vehicle door is disclosed. The window assembly includes a sealing assembly in combination with a window glass. The sealing assembly comprises a sealing, trimming or guiding strip comprising a length of extruded material, a polypropylene or the like part which is joined to the window glass at an edge of the window glass, and a molded material, which is joined to the polypropylene or the like part and connected to said sealing strip. The molded material is preferably made of TPE. The strip is preferably made of EPDM. The molded material is molded in a mold with the polypropylene or the like part, which has previously been molded onto the window glass, and the strip to mold onto and thereby connect to these parts.

11 Claims, 9 Drawing Sheets

U.S. PATENT DOCUMENTS

| | | | | |
|---|---|---|---|---|
| 5,062,248 | A | * | 11/1991 | Kunert .............................. 52/208 |
| 5,085,021 | A | | 2/1992 | Kunert |
| 5,228,738 | A | * | 7/1993 | Kato ................................. 296/93 |
| 5,524,955 | A | * | 6/1996 | Brocke et al. ............ 296/216.09 |
| 5,538,317 | A | * | 7/1996 | Brocke et al. ............ 296/216.09 |
| 5,613,325 | A | | 3/1997 | Mariel |
| 5,669,657 | A | * | 9/1997 | Miyazawa ................ 296/216.06 |
| 5,702,148 | A | * | 12/1997 | Vaughan et al. ........... 296/146.9 |
| 5,723,196 | A | * | 3/1998 | Cornils et al. ................. 428/122 |
| 5,935,356 | A | * | 8/1999 | Soldner ............................ 156/71 |
| 6,546,683 | B1 | * | 4/2003 | Senge ............................... 52/208 |
| 6,598,348 | B2 | * | 7/2003 | Palicki .......................... 49/479.1 |
| 7,082,736 | B2 | * | 8/2006 | Farrar et al. ................... 52/741.1 |
| 2003/0084625 | A1 | * | 5/2003 | Iguchi et al. ..................... 52/208 |
| 2003/0200718 | A1 | * | 10/2003 | Ito ................................ 52/716.5 |
| 2005/0091935 | A1 | * | 5/2005 | Amano et al. ........... 52/204.591 |
| 2006/0168903 | A1 | * | 8/2006 | Kiriakou .................. 52/204.591 |

FOREIGN PATENT DOCUMENTS

| | | |
|---|---|---|
| GB | 2419371 | 10/2004 |
| WO | WO2006/042492 | 4/2006 |
| WO | WO2006/067622 | 6/2006 |

\* cited by examiner

SEALING STRIP FOR VEHICLE WINDOW AND METHOD OF MAKING IT

The invention relates to window assemblies formed by sealing assemblies in combination with window glass and to methods of making them.

Window assemblies are used in motor vehicle body construction to provide, for example, a fixed quarterlight window assembly. It is a problem that such window assemblies include sealing assemblies extruded from materials such as EPDM, which have excellent weather resistance properties, but which are difficult to bond to the window glass.

According to a first aspect of the present invention, there is provided a window assembly for attachment to a frame of a motor vehicle, comprising a sealing, trimming or a guiding strip formed from an extruded material for mounting on the frame and a window glass, the window glass carrying a moulded material joined to the strip.

According to a second aspect the present invention, there is provided a method of forming a sealing assembly for sealingly attached to a frame of a motor vehicle comprising extruding a sealing, trimming or guiding strip for mounting on the frame and then joining a window glass to the strip with a moulded material.

For a better understanding of the invention, window assemblies and methods of making them embodying the invention will now be described, by way of example only, with reference to the accompanying drawings in which.

In the drawings like elements are generally designated with the same reference numerals.

Figure 1:
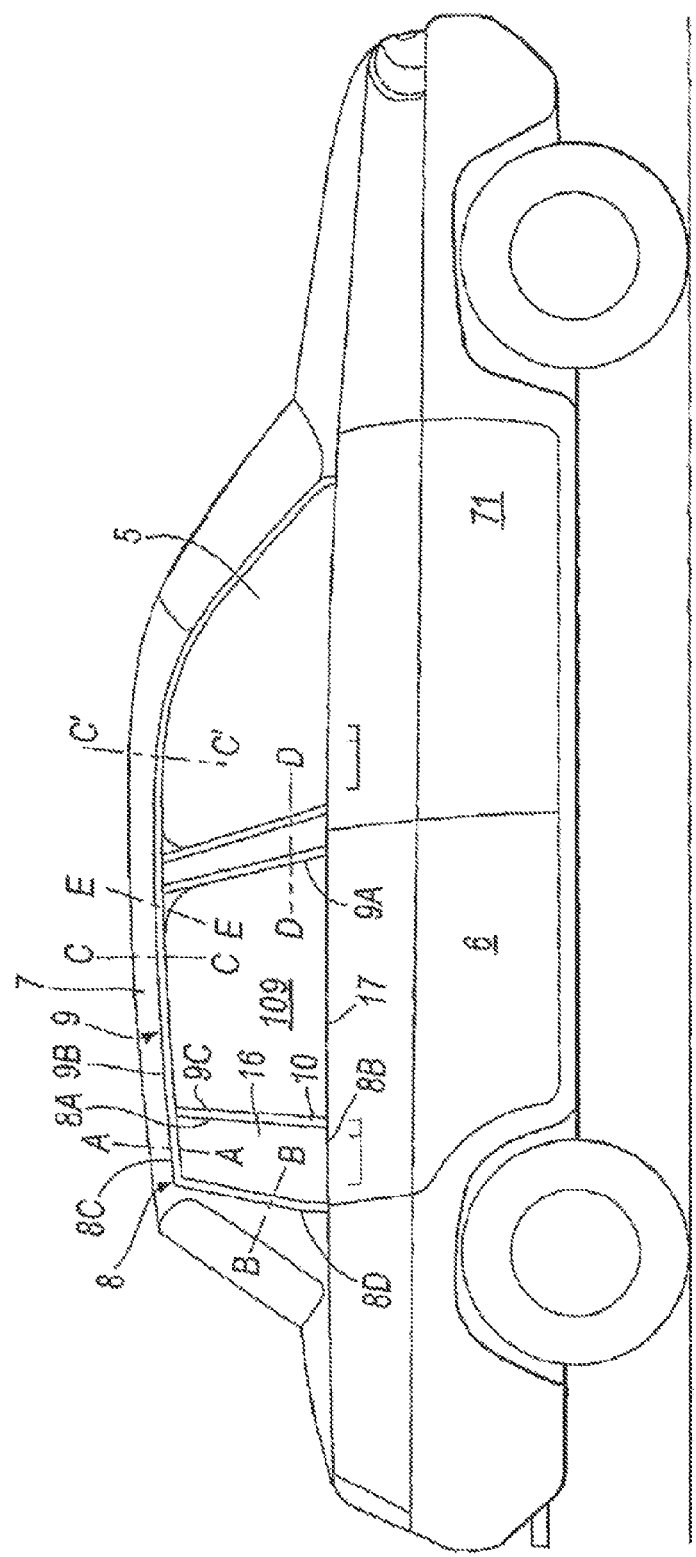
FIG. 1 is a side view of a motor vehicle body including a quarterlight window assembly formed by a sealing assembly and a window glass and including a second window frame assembly.

FIG. 1 shows the side of a motor vehicle body having a rear door 6 and a roof section 7. The rear door 6 includes a quarterlight window assembly generally indicated at 8 defining a quarterlight window opening and a second window assembly generally indicated at 9 and defining a second window opening.

The second window assembly 9 has a window glass 109 which can be raised from and lowered into the door 6 in the usual way. The second window assembly 9 comprises a first generally vertical frame member post 9A alongside the so-called "B" pillar between the front and the rear doors, a frame member part 9B running along the top of the door generally parallel to the roof section 7 and the waist 17, and a second generally vertical post frame member 9C alongside a division pillar. The division pillar (not seen in FIG. 1) extends between the quarterlight and second window assemblies 8, 9. The second window assembly 8 carries a sealing and guiding strip, which will be described in detail below with reference to FIGS. 7 to 9.

Although two assemblies 8,9 are referred to above, the parts may in fact be formed from a single structure.

The quarterlight window assembly 8 is of generally rectangular shape and includes a sealing assembly having a sealing strip 30 (FIGS. 2,3) that is visible, and which will be described in more detail below. The quarterlight window assembly 8 comprises first and second generally vertical frame members 8A, 8D and first and second horizontal frame members 8B, 8C. The first horizontal frame member 8B is alongside a waist 17 of the vehicle body, which forms an edge of the lower part of the rear door 6. The second horizontal frame member 8C runs along the top of the rear door 6 generally parallel to the roof section 7 and the waist 17. The first generally vertical frame member 8A is alongside the division pillar (not seen in FIG. 2) and the second generally vertical frame member 8D is alongside a so-called C-pillar running down the rear side of the periphery of the opening into the vehicle body for the door 6. The first and second vertical frame members 8A, 8D meet the first and second horizontal frame members 8B, 8C at respective ends thereof to define a quarterlight window assembly. A window glass 16 is located in the quarterlight window assembly in a manner to be described below.

The window frame members 8A, 8B, 8C, 8D, 9A, 9B, 9C, 9D carried by the rear door 6 are, in this example, made of metal, such as extruded aluminium, or of hard plastic.

The present embodiment is primarily concerned with the structure and fabrication of a sealing trimming and guiding strip of the second window assembly and a sealing trimming and guiding strip for quarterlight window assembly, and is particularly concerned with the structure of such a strip for mounting on the frame of the quarterlight window assembly. It should be understood however that the present embodiment could be applied to the front main window and front quarterlight.

Figure 2:
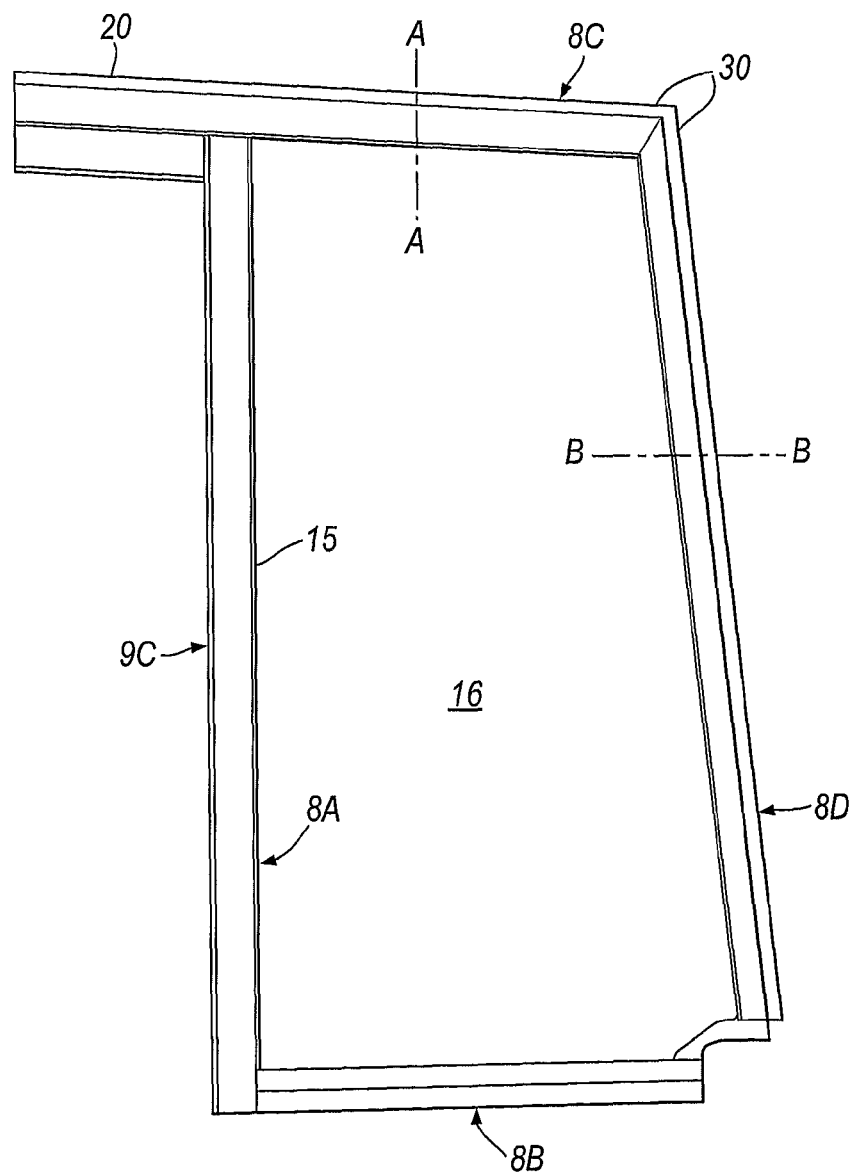
FIG. 2 is a side elevational view of the quarterlight window assembly of FIG. 1.

Referring to FIG. 2, the sealing assembly includes a sealing strip 30 made by extrusion to extend continuously around the quarterlight frame members 8A, 8B, 8C, 8D and also includes a portion 20 that extends at least partially around the second window frame members 9B. The continuously extruded strip 30 gives a pleasing external visual appearance with no joins. The construction of the sealing strip 30 will be further understood from the following description.

Figure 3:
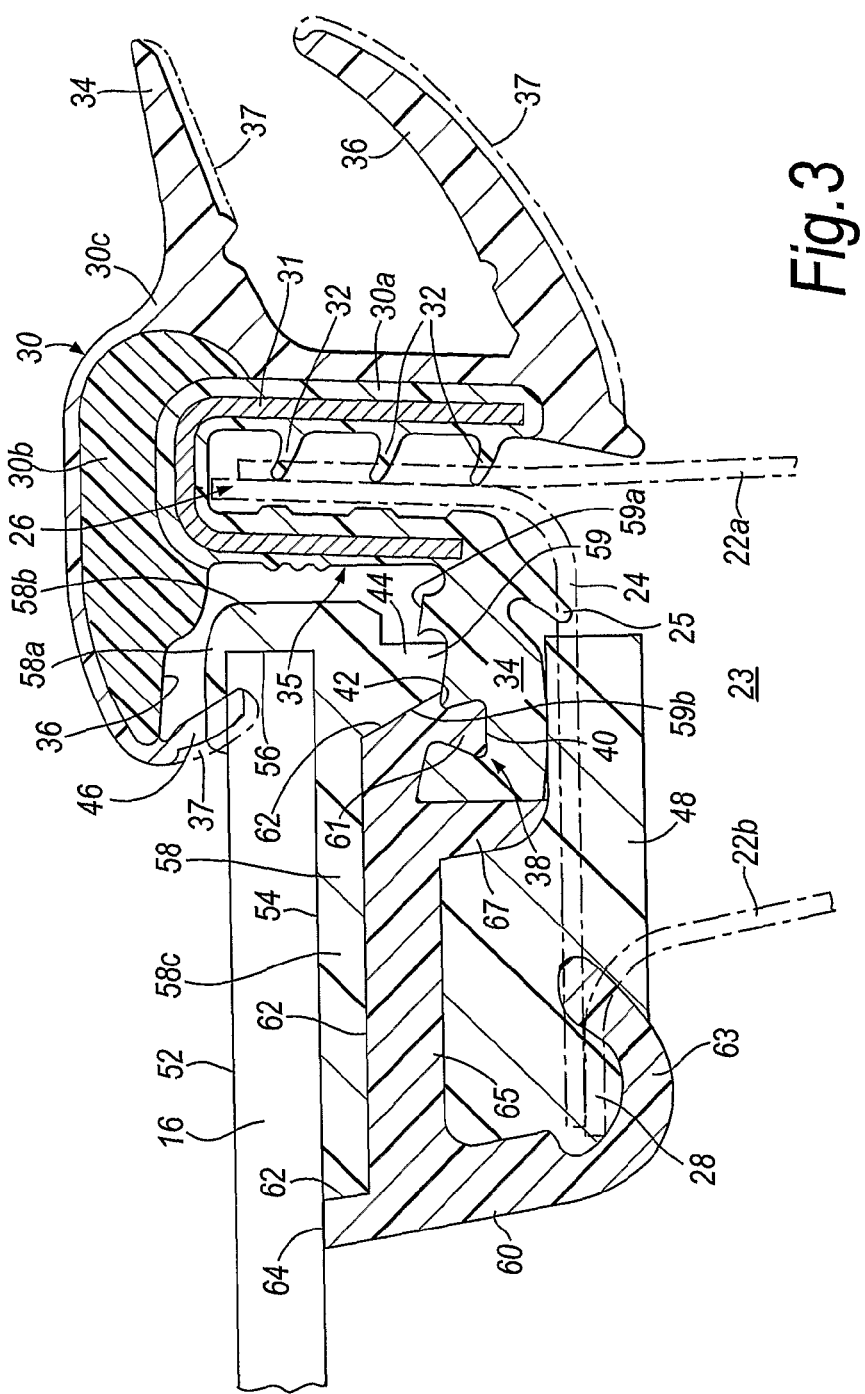
FIG. 3 is a cross-sectional view on the line A-A of FIGS. 1 and 2 of a first example of a part of the quarterlight assembly of FIGS. 1 and 2, parts of the window assembly that are deformed in use being shown undeformed in the Figures for illustrative purposes.

Referring next to FIG. 3, the embodiment of the sealing strip 30 shown in that Figure is for cooperation with frame assemblies 8,9 that include first and second space panels 22a, 22b interconnected at their ends by a third panel 24. The third panel 24 is generally L-shaped with one limb in face-to-face contact with an edge of the first panel 22a to form a first flange 26 and the other limb extending away from the first panel 22a and connected at its free end to an outwardly bent end of the second panel 22b to form a second flange 28. The third panel 24 may be connected to the first and second panels 22a, 22b by any suitable means such as spot welding. The first, second and third panels 22a, 22b, 24 define between them an enclosed space 23.

The sealing strip 30 is formed in three parts—an inner section 30a of a relatively softer material, a cover strip 30b of a relatively harder material and an outer strip 30c of a relatively softer material. These parts are co-extruded together from a material such as EPDM.

The inner section 30a defines a first U-shaped channel engaging the first flange 26. The inner section 30a incorporates a channel-shaped reinforcing carrier 31 embedded within the material of the inner section 30a during the extrusion process. The carrier 31 may be of metal and may take any suitable form. It may be in the form of a continuous un-apertured metal channel or it may be slotted or slitted or otherwise apertured to increase its flexibility. In another form, it comprises a series of side-by-side generally U-shaped metal elements defining the channel and either entirely disconnected from each other or connected by, for example, short integral flexible connecting links. In a further form, the carrier comprises looped wire. Other forms of carrier 31 may also be used.

The inner section 30a includes integral resiliently deformable lips 32 extending inwardly of the channel and bearing against the first flange 26 to help hold the sealing strip 30 securely in position on the first flange 26. The gripping force of the lips 32 is assisted by the resilience of the metal carrier 31. These lips 32 may be extruded so as to be of softer material than the remainder of the inner section 30a to increase their frictional grip.

The inner section 30a also includes a projecting wall 34 extending outwardly from an end of one leg of the U-shaped inner section 30a. The wall 34 extends over the third panel 24 and, on the side of the wall opposite the third panel 24, is formed with a longitudinal recess 38 having a base 40 and an open side 42. The recess 38 extends longitudinally along the wall 34 parallel to the first flange 26 with the open side 42 being of narrower width than the width of the base 40. The wall 34 also has a lug 44 extending along the wall 34 on the same side of the recess 38 parallel to the flange 26 and located inwardly of the recess 38.

The inner section 30a is also provided with a lip 25 resiliently engaging the third panel 24.

The cover strip 30b overlies the exterior of the base of the channel formed by the inner section 30a and includes a wall 35 projecting to the same side of the inner section 30a as the first wall 34. The first wall 34 and this second wall 36 together form a U-shaped window glass receiving channel 39 with the associated limb of the inner section 30a forming a base 35 of the channel 39.

The outer strip 30c extends over the cover strip 30b and around the limb of the U-shaped inner section 30a opposite the window glass-receiving channel. The outer strip 30c has a resilient sealing lip 46 extending from the end of the second wall 36 inwardly of the window glass-receiving channel. The outer strip 30c also includes further resilient sealing lips 34, 36 projecting away from the U-shaped inner section 30a on the opposite side to the second wall 36 for engaging the periphery of a rear door opening in the motor vehicle body when the rear door 6 is closed. The outwardly facing surfaces of the lips 34, 36, 46 are coated with flock 37. The flock 37 can be formed as part of an extrusion process that forms the sealing strip 30.

The sealing strip 30 cooperates with a window glass 16. The window glass 16 has a first face 52 and a second face 54 joined by an edge 55. The window glass carries, at the edge 56, a cap member 58, typically made of polypropylene and hereinafter referred to as "the PP part". The PP part 58 includes a first portion 58a extending a short distance over the first face 52 of the window glass 16, a portion 58b extending around the edge 56 and a portion 54 extending over the second face 54 of the window glass 16 adjacent the edge 56. The second portion 58c is longer than the first portion 58a. The second portion 58c is formed with an outwardly extending projection 59. As seen in FIG. 3, the projection 59 is of generally trapezoidal cross-section with a face 59a facing the base 35 of the window glass receiving channel and an opposite face 59b extending at an angle of the second face 54 of the window glass 16. The function of these faces 59a, 59b will be described in more detail below.

The window glass 16 also carries on the second face 54 a connecting part 60 made of a moulded material such as a thermoplastic polyester elastomer material. This will be referred to as "the TPE part". The TPE part 60 is moulded over the PP part 58 using a mould part 48 seen in FIG. 3 and whose use will be described in more detail below. The TPE part 60 includes a body 65 that overlies the second portion 58c of the PP part 58. At one end the body 65 is formed with an integral hook-shaped lip 63 (shaped by the mould 48). This is for sealing engagement with the second flange 28. At an opposite end, the material of the body 65 forms a key 61 in the recess 38 that locks the TPE part 60 to the sealing strip 30 and so locates the window glass 16 relative to the strip 30. An end face 62 of the TPE part 60 abuts the angled face 59b of the projection 59 on the PP part 58. The TPE part 60 also includes a projecting flange 67 that abuts the end of the first wall 34.

In this way, the window glass 16 is accurately located relative to the sealing strip 30b and hence to the frame assembly 8. The face 57a and the lug 44 limits the depth of insertion of the window glass 16 into the window glass-receiving channel and prevents the end of the PP part 58 abutting and wearing the inner section 30a of the base 35 of the strip 30. The resilient sealing lip 46 on the outer strip 30c bears against the window glass 16 to prevent the ingress of moisture into the window glass-receiving channel. Likewise, the hook-shaped lip 63 seals against the second panel 22b—it being remembered that the mould member 48 is not present in the completed quarter light assembly.

The quarter light assembly is formed in the following sequence of steps. First, the sealing strip 30 is formed by an extrusion process in which the inner section 30a, the cover strip 30b and the outer strip 30c may be co-extruded simultaneously. The PP part 58 is formed on the window glass by, for example, moulding. Next, the portion of the window glass 16 carrying the PP part 58 is placed in the mould 48 together with the sealing strip 30 with the window glass 16 arranged relative to the strip 30 in a required disposition. The TPE part 60 is then moulded using the mould so as to form the lip 63, the key 61 and the projection 67. In addition, the end 64 of the TPE part bonds to the window glass 16. In this way, the window glass 16 is securely and accurately connected to the sealing strip 30. The assembly of the window glass 16, the PP part 58 and the TPE part 60 together with the sealing strip 30 are removed from the mould 48 and are then mounted on the flanges 26, 28.

It is not essential for the TPE part 60 to bond to the window glass 16—the TPE part 60 could bond only with the PP part 58.

Figure 4:
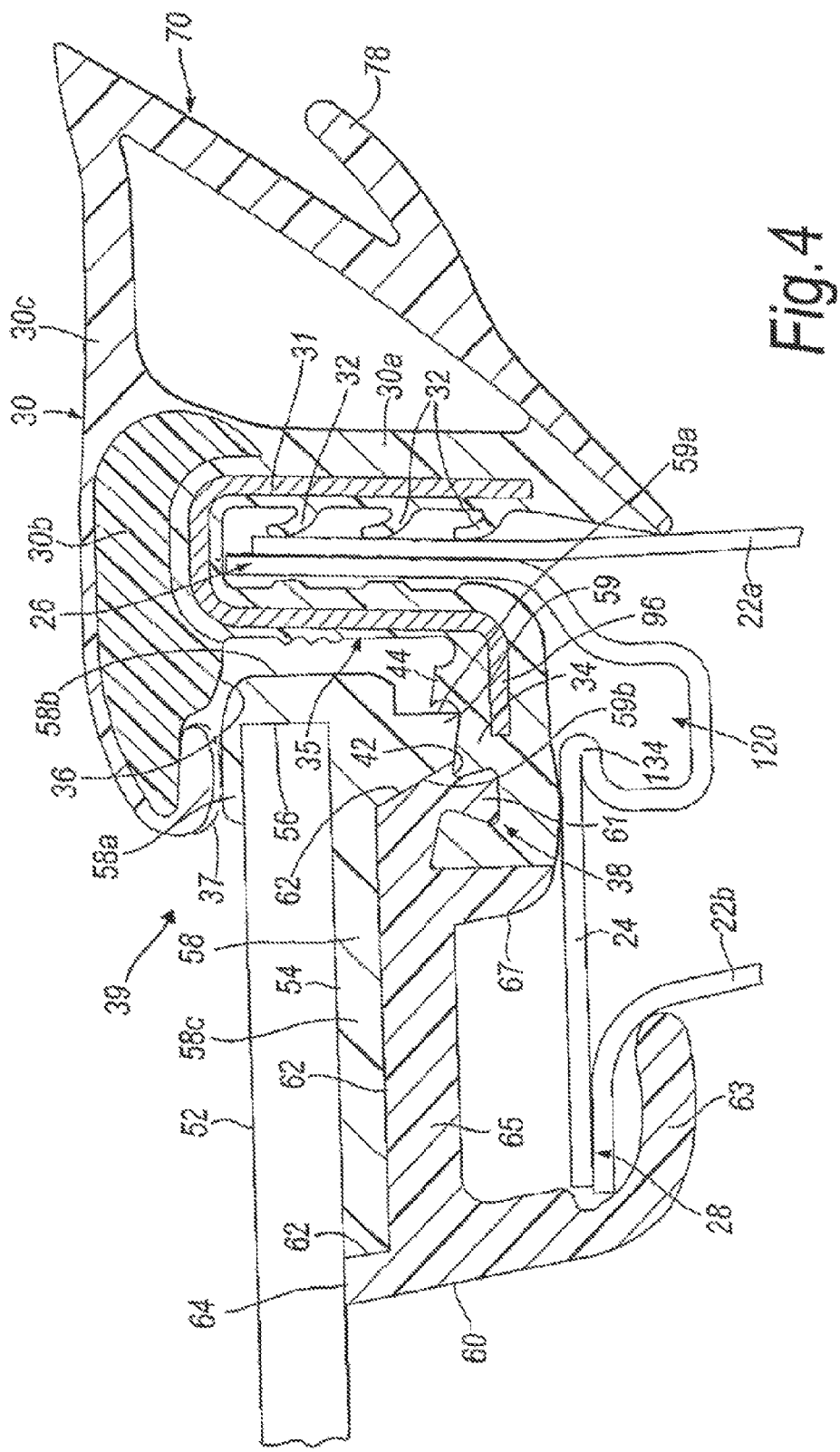
FIG. 4 is a cross-sectional view on the line A-A of FIG. 2 of a second example of the part of the quarterlight assembly shown in FIG. 3.

FIG. 4 shows a modified form of the embodiment described with reference to FIG. 3. The clamping lip 63 and the resilient sealing lip 46 are both shown deformed in their respective in use positions, pressing respectively against the panel 22 and against the PP part 58. The mould 48 is absent.

The embodiment of FIG. 4 also differs from the embodiment of FIG. 3 as follows.

The third panel 24 is shaped to form a channel 120 and a flange 134 extending part way over an open side of the channel 120. The carrier 31 has an integral extension 96 which extends at right angles to the first flange 26 and is embedded in the first wall 34 of the inner section 30a. The carrier extension 96 increases the rigidity of the first arm 34 in the region of the channel 96 to improve the positioning thereof.

Instead of the two sealing lips 34, 36 shown in FIG. 3, the outer-strip 30c of FIG. 4 has a shoulder 70 of generally triangular cross-section for sealing engagement with the periphery of a rear door opening of the motor vehicle body when the rear door 6 is closed. The generally triangular shoulder 70 is hollow and is integrally extruded with the rest of the sealing strip 30. A lip 78 extends from a side of the triangular shoulder 70 also for sealing engagement against the frame of the motor vehicle body. A similar frame and a sealing assembly including the triangular shoulder 70 is described further in UK patent application no. 0510375.9 (GDX North America Inc.), which is hereby fully incorporated by reference.

Figure 5:
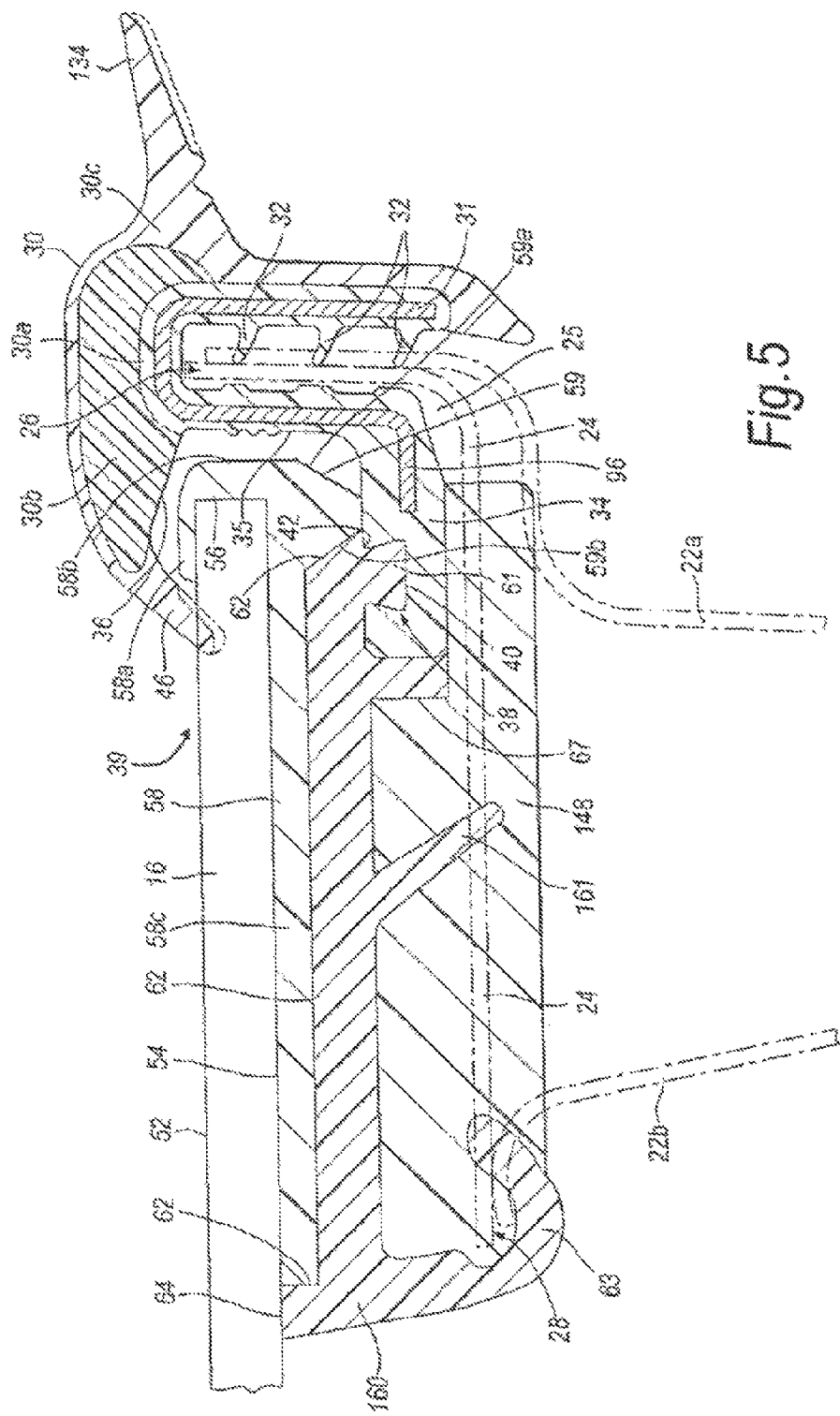
FIG. 5 is a cross-sectional view on the line B-B of FIG. 2 of a second part of the quarterlight assembly of FIG. 1 with parts of the window assembly that are deformed in use being shown undeformed for illustrative purposes.
Figure 6:
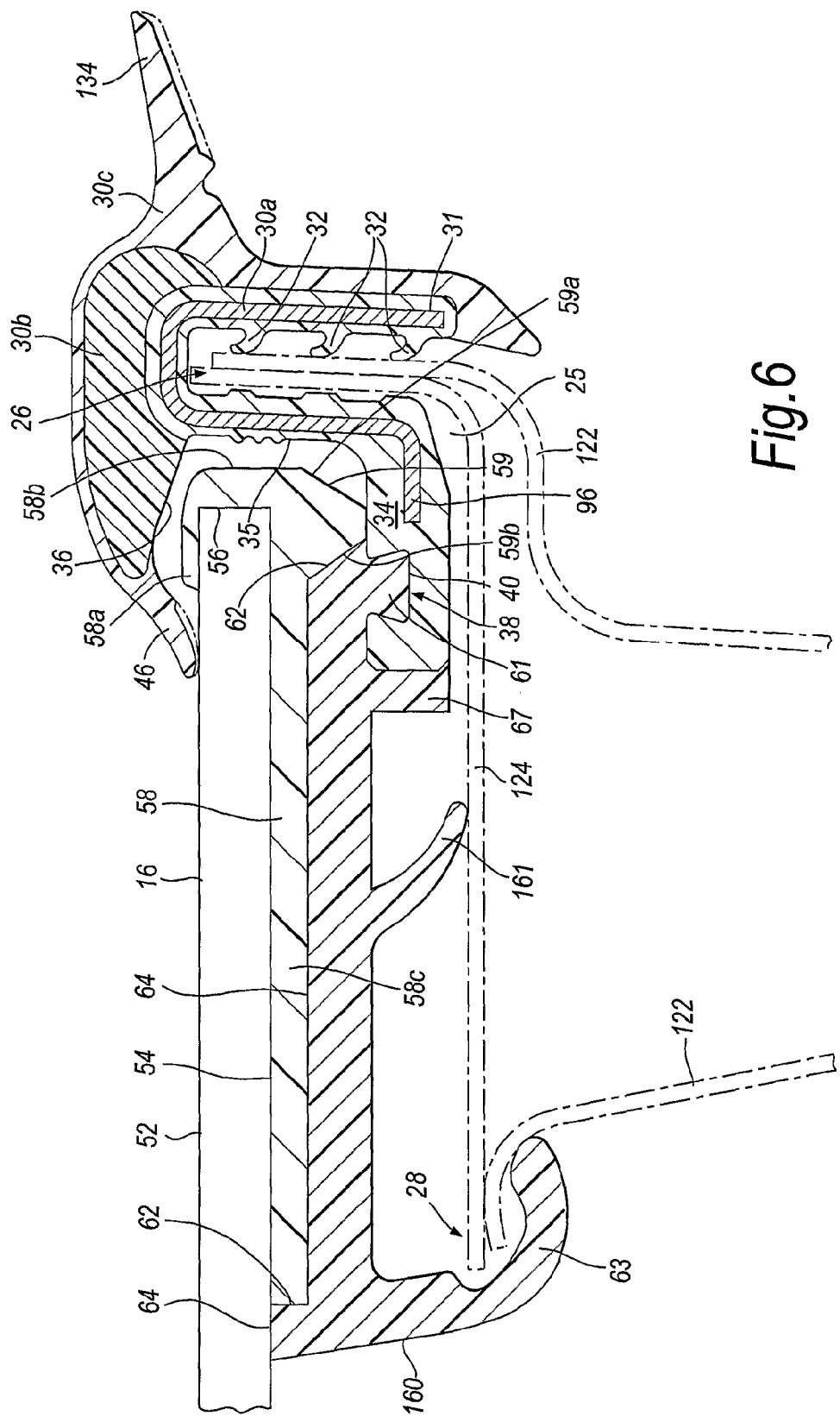
FIG. 6 is a similar view to FIG. 5 but with the parts which are deformed in use being shown in their respective in use positions.

Referring next to FIGS. 5 and 6 this shows a cross-section of the window assembly on the vertical frame portion 80. This embodiment has parts in common with FIGS. 3 and 4. Those parts will be given the same reference numbers in FIG. 5 as in FIGS. 3 and 4 and will not be described in detail. The outer strip 30c includes a single resilient sealing lip 134 for engaging the periphery of a rear door opening in the motor vehicle body when the rear door 6 is closed. No lug 44 projects from the first wall 34 (such as is shown in FIG. 4). The carrier 31 has an extension 96 that extends into first arm 34 as shown in FIG. 4. The first panel 22a includes a fold that increases the spacing between the first and second flanges 26, 28 so that the third panel 24 is longer than in the embodiments of FIGS. 3 and 4.

The TPE part 160 is formed using a mould 148 to have an elongate body and to have a second lip 161 corresponding in shape to the shape of a middle channel 164 of the mould 148. The second lip 161 is shown shaped as moulded and overlapping the panel 22 for illustrative purposes only in FIG. 5. In use, the sealing assembly is mounted on the flange 26 in the same manner as the sealing assembly described with reference to FIG. 3. The second lip 161, in use, resiliently presses against the panel 22b, as shown in FIG. 6. The first lip 33 engages the second flange 28 and the lip 46 on the outer strip 30c engages the first surface 52 of the window panel.

The sealing assemblies described with reference to FIGS. 4, 5 and 6 are formed and assembled in the same way as the sealing assembly of FIG. 3.

The sealing strip 30 may be integrally extruded together. Alternatively, they may be separate parts which are moulded together at the corner of the C pillar and the roof section 7.

There will now be described a sealing arrangement of the second window frame assembly with reference to FIGS. 7 to 9.

Figure 7:
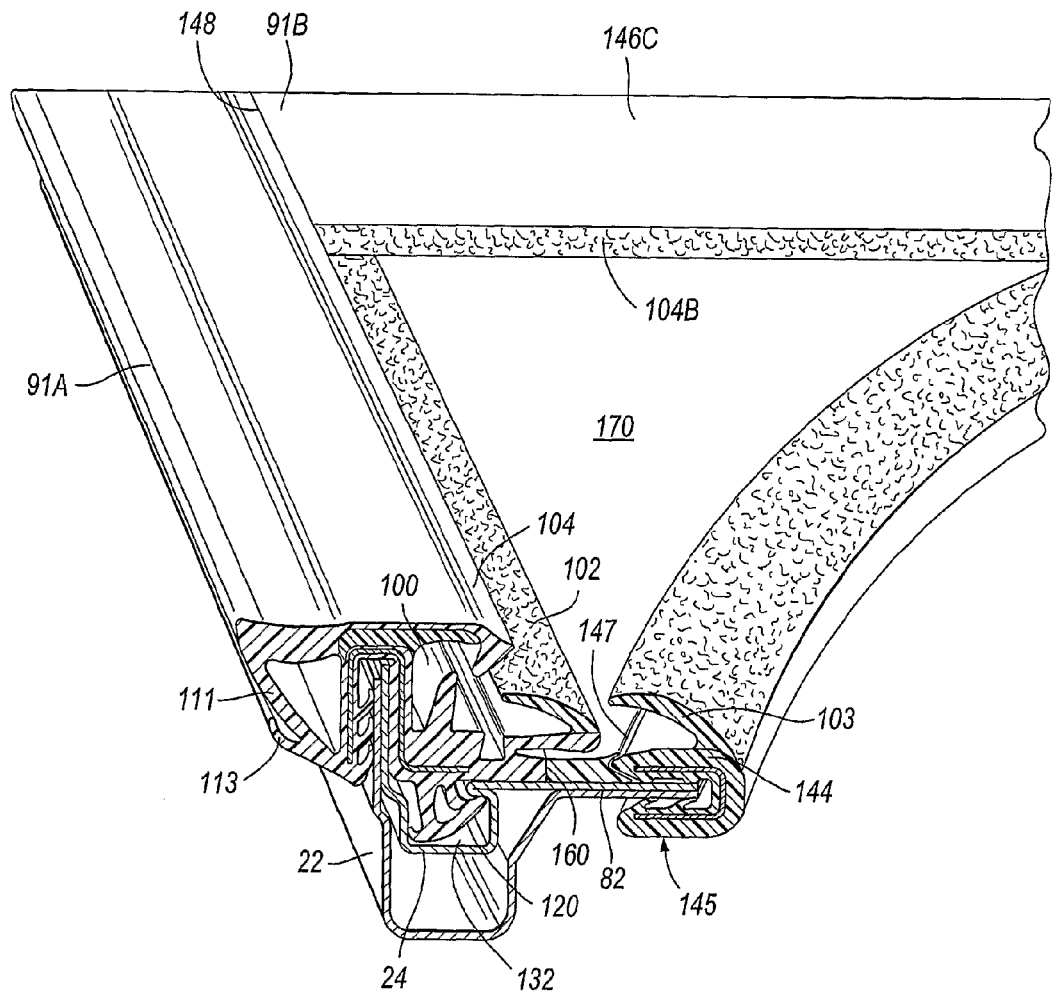
FIG. 7 is a diagrammatic perspective view of a corner region of the second frame assembly of FIG. 1 cut away along the line E-E of FIG. 1.
Figure 8:
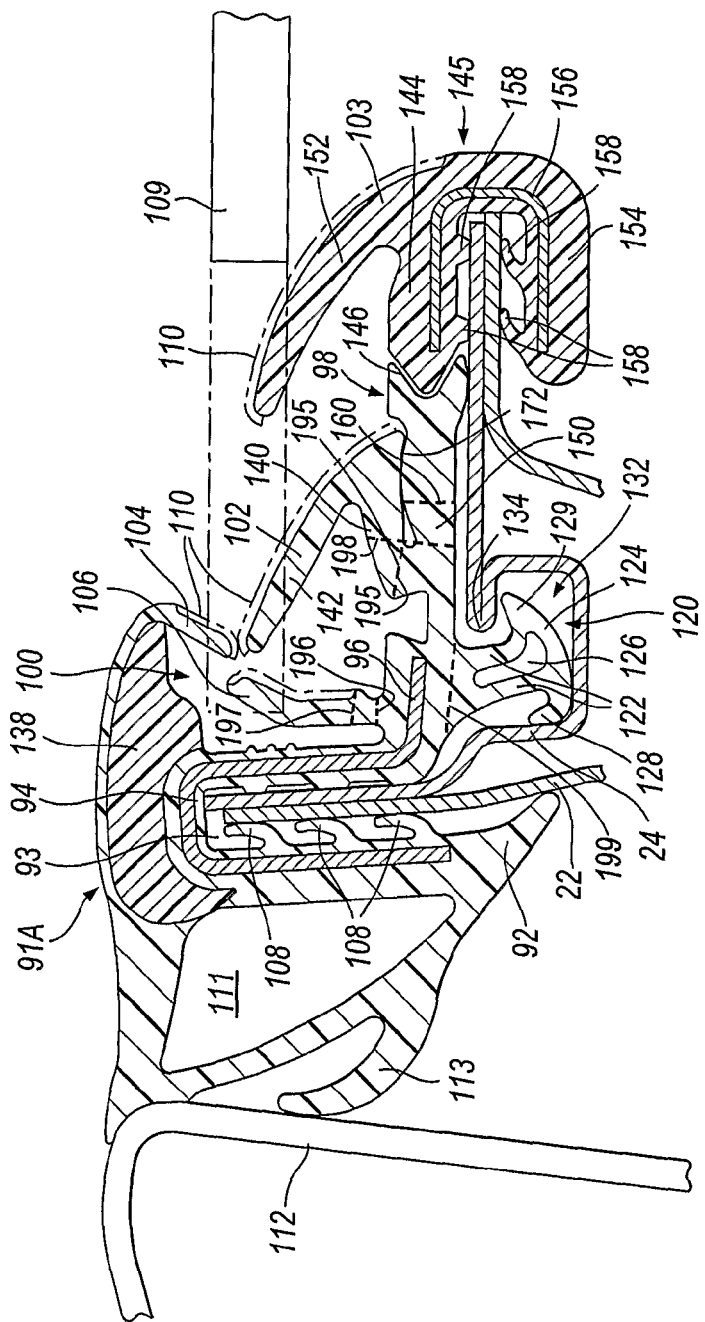
FIG. 8 is a cross-sectional view of the second frame assembly of FIG. 7 on the line C-C of FIG. 1.
Figure 9:
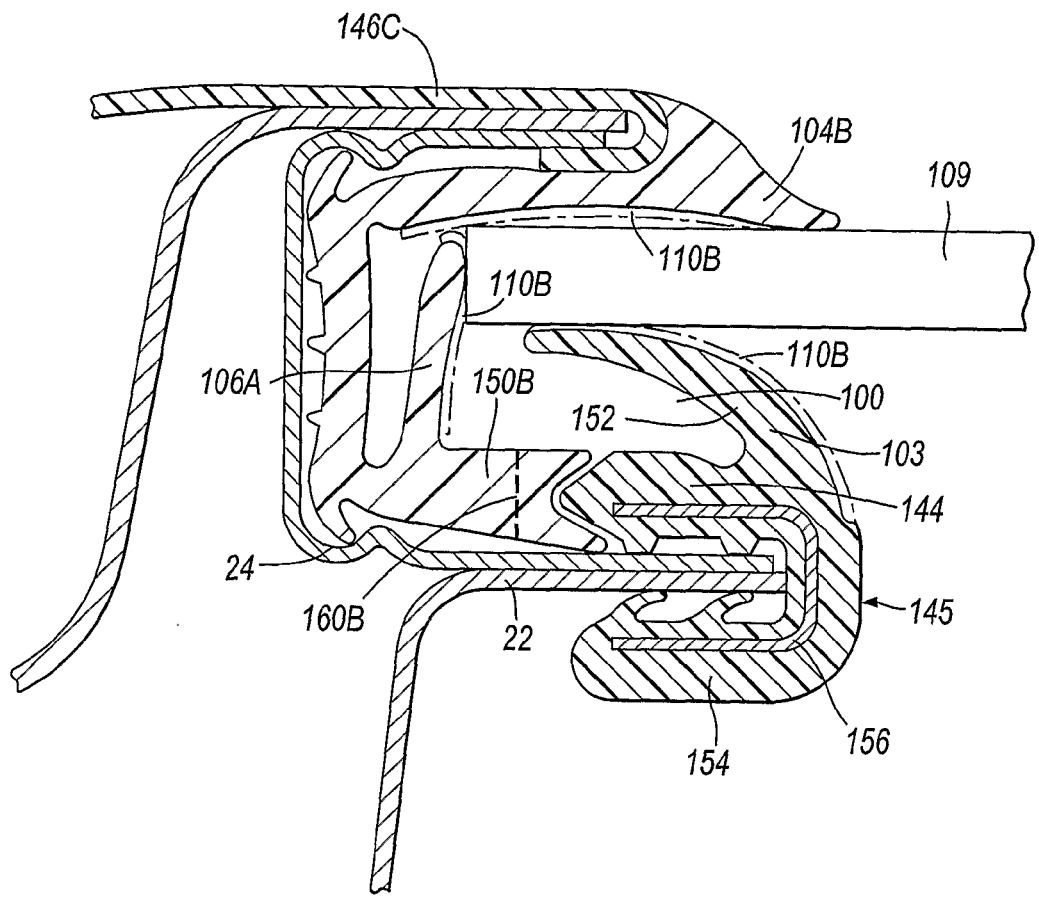
FIG. 9 is a cross-sectional view of the window assembly of FIG. 8 on the line D-D of FIG. 1.

FIG. 7 shows a perspective view of first and second sealing strips 91A and 91B and second window frame assembly 8 in the corner region (cut along line E-E of FIG. 1), FIG. 8 shows a cross-section taken along line C-C of FIG. 1 and FIG. 9 shows a cross-section of the rear door 6 "B" pillar taken along line D-D of FIG. 1. (A cross-section taken along line $C^1$-$C^1$ of the front door 71 frame may have a similar appearance to that of FIG. 8 and a cross-section of the front door 71 "B" pillar taken along line D-D may have a similar appearance to that of FIG. 9.

Referring mainly to FIG. 8, the first strip 91A is formed similarly to the sealing strip 30 of FIG. 4 but the first wall 34 is replace by a wall 98 of that includes a first lip 102, with the opposite wall of the glass-receiving channel 100 is formed by a second lip 104 similar to the lip 46 in FIG. 4. The lip 102 includes a base part 140 and a sealing part 142, the latter pressing against the window glass 109 in use when the window is closed. A base lip 106 is formed at the base of the channel 100. The base lip 106 extends approximately parallel to the base of the channel 100. As the window glass 109 closes, the glass 109 presses against the base lip 106 to improve the seal with the glass.

A generally hook-shaped part 120 is integrally extruded on the wall 98 on the side thereof opposite the lips 102, 104. The hook-shaped part 120 includes walls 122 which meet at a base 124, and between them define a space 126. The base 124 includes projections 128,129 at opposite ends thereof for engaging the channel 120 formed by the third panel 24, and in particular engaging beneath the flange 134 formed by the panel 24 at the entrance to the channel 120. The walls 122 and base 124 are resiliently deformed as the hook-shaped part 120 is pushed into the channel 132, whereafter they resile and locate the strip 91A with respect to the channel 132. The carrier extension 96 increases the rigidity of the strip 91A in the region of the hook-shaped part 120 to improve this positioning.

The base 140 of the lip 142 integrally extends from the region where the hook-shaped part 120 and base lip 106 meet. The base 140 is generally planar. From approximately midway along the base 140 of the lip 102, a generally planar limb 150 extends. The limb 150 extends generally parallel to the base 140 and forms an inner part of the wall 98.

The outer part of the wall 98 is formed by the central limb 144 of reverse E-shaped "cosmetic" member 145. The adjacent end faces of the limb 150 and limb 144 are spaced apart by a gap 146 and may have respective corresponding concave/convex configurations as shown. The upper limb of the member 145 forms an outer lip 103 which includes a sealing part 152, similar to the sealing part 142 of the lip 102. The lower limb of the member 145 forms a cosmetic lip 154 which extends over the panels 22,24 so that the distal edges of these panels (which can be seen in FIG. 7) are hidden. A generally U-shaped carrier 156 made of rigid material is embedded with the central limb 144 and the cosmetic lip 154 of the member 145 and extends around the distal ends of the panels 22,24. The carrier 156 serves to clamp the member 145 to the panels 22,24. Integral flexible lips 158 extend from the central limb 144 and cosmetic lip 154 to increase the clamping/gripping force.

In use, the sealing strip 91A is mounted in position on the flange 80 leading towards and up to the corner 18 by positioning the strip so that the flange 80 engages in the channel 93 and the hook-shaped part 120 engages the channel 132. The strip 91A firmly grips the flange 80, the gripping force being assisted by the resilience of the metal carrier 94 and also by the provision of integral flexible lips 108 which extend inwardly of the channel 93. The lips 108 may be extruded so as to be of softer material than the remainder of the extruded material 92, to increase their frictional grip. The cosmetic member 145 is mounted separately onto the two panels 22, 24.

The outwardly facing surfaces of the lips 102, 103, 104 and 106 are coated with flock 110 where they meet the window glass 109.

As shown in FIG. 8, the sealing strip 91A includes a hollow shoulder 111 on the outside of the window frame, that is, on the outside edge of the door. This shoulder 111 engages the periphery 112 of the door opening when the door 5 is closed, to provide a seal around the edge of the door. A lip 113 extends from the shoulder 111 and also engages the frame 112 of the door opening when the door 5 is closed.

A strip 91B shown in FIGS. 7 and 9 extending along the B-pillar 12 is generally U-shaped and does not include the channel 93 but instead is clamped by a U-shaped channel formed by the panels 22,24. The upper (in FIG. 9) leg of the U-shaped channel extends generally parallel to the lip 104B of the strip 91B, pressing this lip against the window glass 109. No carrier 94 is provided. The upper leg of the U-shaped channel 81 is covered by a decorative moulding 146C, which extends around and covers the ends of the panels 22, 24. Base lip 106A extends from the lower limb 150B of the strip 91B and seals against the end of the window glass 109. The lips 104B and 106B may have a flocked surface 110B in the same way as lips 104 and 106. The hook-shaped part 120 is also omitted as it is not required and no corresponding channel 132 is provided in the U-shaped channel 81. The reverse E-shaped member 145 extends along both the roofline 14 and the "B" pillar 12. The adjacent end faces of the lower limb 150B and limb 144 of the member 145 are spaced apart by a gap 147 and may have respective corresponding concave/convex configurations as shown.

The two strips 91A and B are joined at a line 148 (FIG. 7). In this way, the strips 91A and 91B present their glass-receiving channels 100 in the plane of the window opening 10 so that the sliding window glass 109 enters the channels 100.

It is generally desired to have a single extruded glass run extending continuously along the B-pillar and another extruded glass run extending continuously along the roof line and the C-pillar. This provides an attractive appearance, without visible joins (other than join 148 at the corner 18 in the embodiment described).

A platform 82 is present at the corner 18 but is not present at other areas of the frame 8 (for example as it extends generally parallel to the vehicle roof 14 and generally parallel to the A or B pillars 11,12—other than at the corner 18).

Where the platform 82 is present, the distance between the base of the channels and the distal end of the platform 82/panels 22,24 is increased. In order to accommodate this variation in distance, the following steps are taken. The extruded material of the limb 150 of the strip 91A is cut at cut line 160 (in FIG. 8). The extruded material to the right of the cut line 160 is discarded. Similarly, the extruded material of the limb 150B of strip 91B is cut at cut line 160B (in FIG. 9), and the extruded material to the right of the cut line 160B is discarded. A planar sheet of rubber material 170 (in FIG. 7) is then inserted and moulded onto the limbs 150 and 150B at the points of the cut lines 160,160B to form a flap of flexible material extending over the platform 82. The flap is generally triangular in shape but curved along the hypotenuse.

The sealing strip 91A in FIG. 8 extends form the sealing strip 30 of the quarterlight window—the strips 30, 130, 91A are integrally formed by the same extrusion process. To form the strip 30 shown in FIG. 4, the strip shown in FIG. 8 is cut at cut lines 160, 197, 198, 199. To form the strip 30 shown in FIG. 6, the strip in FIG. 8 may be cut at cut lines 195, 196, 198, 199. In each case, the parts that do not include the metal carrier 94 is discarded.

Advantageously, the join between the inner limb 150 and the moulded part 170 is obscured from view by the base part 140 of the lip 102, and the join between the limb 150B and the moulded part 170 is obscured from view by the moulded part 146 and/or the lip 104B.

The moulded part 170 may be formed of TPE or EPDM or any other suitable material. The end of the base part 140 from which the sealing part 142 integrally extends may be joined to the moulded part 170 at the region 172 during the moulding operation which forms the part 170 in order to better locate the sealing part 142 of the lip 102. The connection between the base part 140 and the moulded part 170 at the region 172 may alternatively be achieved by applying an adhesive. It should be understood that the connection between the base part 140 and the moulded part 170 at region 172 is not necessary.

At a region along the roof line of the frame 8 but spaced from the corner 18 and the platform 82 and along the "B" pillar 12 but spaced from the corner 18 and the platform 82, the moulded part 170 is not required.

As explained above, the moulded part 170 forms a flap portion which conceals the platform 82. The adjacent end faces of the moulded part 170 and the limb 144 of member 145 are spaced apart by a gap 147 and may have respective corresponding concave/convex configurations as shown. The gap 147 between the moulded part 170 and the limb 144 of the member 145 may be obscured from view by the lip 103.

The provision of two lips 102 and 103 may tend to improve sealing, thereby reducing moisture ingress and improving sound insulation. The lips may be formed from extruded material—avoiding the need for post-flocking. The provision of two lips 102 and 103 is not essential.

The limbs 150,150B need not be cut along cut lines 160, 160B. The material of moulded part 170 may be moulded directly onto the distal ends of the limbs without any cutting.

It should be appreciated that various modifications can be made to the embodiments described above within the scope of the invention. The shape of the parts (including the PP part, the TPE part, the sealing strip and the form) can be varied. In particular, the quarterlight window frame does not have to be of rectangular shape—the sides may be curved and/or corners rounded or the frame may be partially or entirely oval. Also, the gap 147 may be absent and the two opposing surfaces defining the gap abutting. The PP part may be omitted.

The carrier 31 is also not essential—an alternative sealing strip could be extruded without the carrier 31. This may in particular be desirable if a lighter sealing strip is required.

In addition, the sealing strip need not be extruded in a single piece—it could be extruded in several pieces, with or without a carrier.

The invention claimed is:

1. A window assembly for attachment to a frame of a motor vehicle, comprising:
   a strip formed from an extruded material for mounting on the frame with said strip including a first coupling portion;
   a window glass coupled to said strip; and
   a connecting part coupled to said window glass and formed from a moulded material with said connecting part including a second coupling portion fixedly engaging said first coupling portion to interlock said connecting part to said strip;
   wherein said first coupling portion defines a recess and said second coupling portion includes a key with said key engaging said recess and said recess at least partially encapsulating said key to join said window glass to said strip and to fix said window glass relative to said strip;
   wherein said strip includes a channel receiving an edge of said window glass, said channel being formed with said recess and said connecting part being located at said edge of said window glass;
   wherein said window glass carries a cap member extending around and connected to said edge of said window glass, said connecting part overlying and being connected to said cap member.

2. An assembly according to claim 1 wherein said recess extends along a length of said channel.

3. An assembly according to claim 1 wherein said channel includes first and second walls interconnected by a base, said first wall defining said recess.

4. An assembly according to claim 3 wherein said strip includes a reinforcement, said reinforcement extending into said first wall.

5. An assembly according to claim 3 wherein said second wall includes a lip sealing against said window glass.

6. An assembly according to claim 1 wherein said connecting part includes a lip for engaging the frame of the motor vehicle.

7. An assembly according to claim 6 wherein said connecting part includes a second lip for engaging the frame of the motor vehicle.

8. An assembly according to claim 1 wherein said cap member is formed at least substantially of polypropylene.

9. An assembly according to claim 1 wherein said moulded material is made at least substantially of thermoplastic elastomer (TPE) material.

10. An assembly according to claim 1 wherein said strip is made at least substantially of ethylene propylene diene Monomer (EPDM) material.

11. An assembly according to claim 1 wherein said strip is extruded in a closed loop.

* * * * *